Sept. 27, 1932.  C. C. FARMER ET AL  1,879,667
BRAKE CYLINDER
Filed Oct. 11, 1927
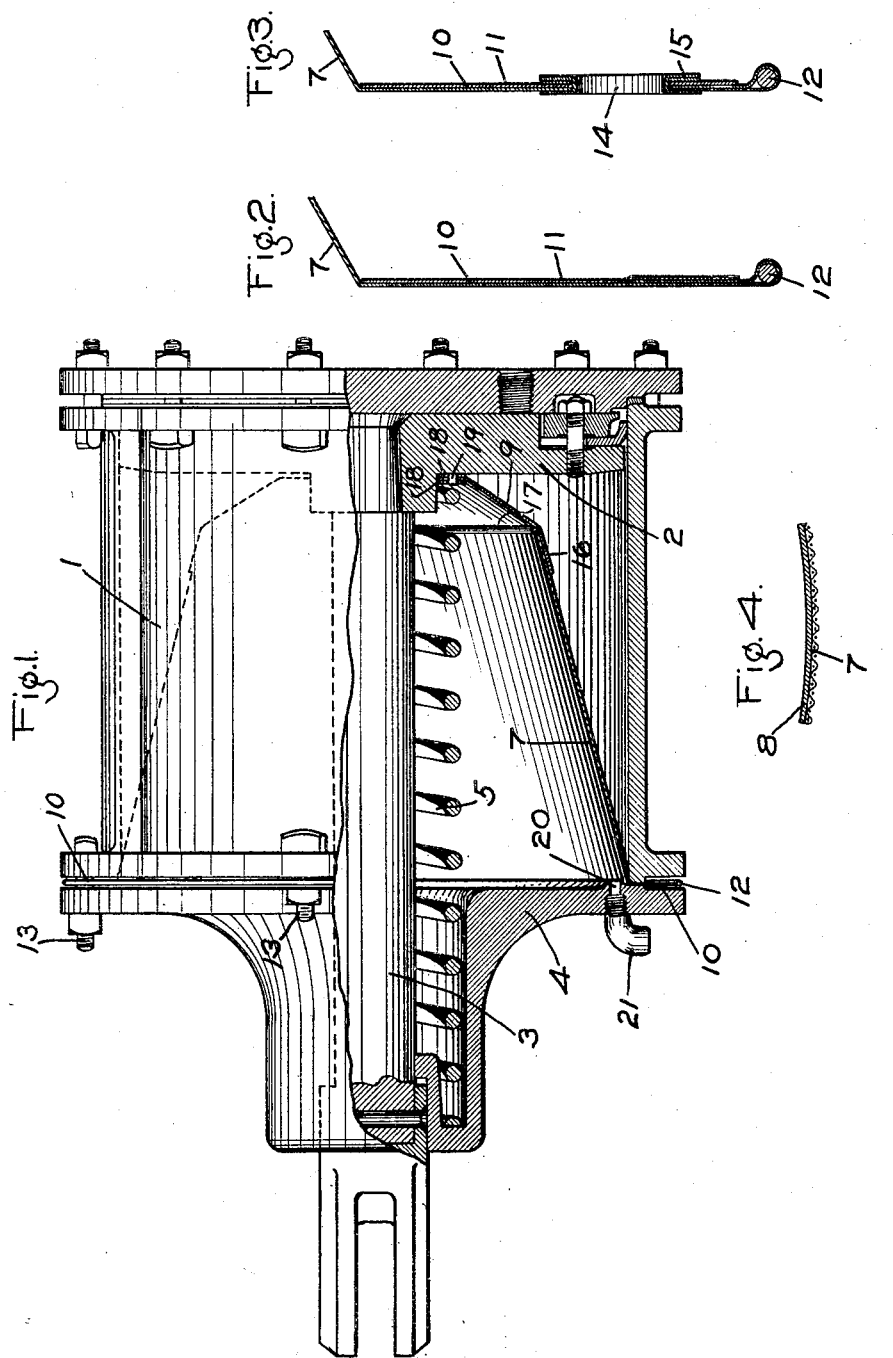
INVENTORS
CLYDE C. FARMER
AND
JOSEPH C. McCUNE
BY *Wm. M. Cady*
ATTORNEY Patented Sept. 27, 1932

1,879,667

UNITED STATES PATENT OFFICE

CLYDE C. FARMER, OF PITTSBURGH, AND JOSEPH C. McCUNE, OF EDGEWOOD, PENNSYLVANIA, ASSIGNORS TO THE WESTINGHOUSE AIR BRAKE COMPANY, OF WILMERDING, PENNSYLVANIA, A CORPORATION OF PENNSYLVANIA

BRAKE CYLINDER

Application filed October 11, 1927. Serial No. 225,486.

This invention relates to brake cylinders as employed in a fluid pressure brake system on railway cars.

With the usual brake cylinder, trouble has been experienced, due to water and dirt collecting in the chamber at the non-pressure side of the brake cylinder piston. When the brake cylinder piston moves toward release position, air from the atmosphere enters the chamber around the loosely fitting piston rod, and since the clearance space around the piston rod is relatively small, air rushes in with considerable velocity, carrying with it dirt and moisture.

Moisture collecting in the brake cylinder causes rusting, and in cold weather tends to freeze on the inner wall of the brake cylinder. Dirt or other foreign matter which may enter the brake cylinder acts as an abrasive and tends to unduly wear the brake cylinder piston packing.

The principal object of our invention is to provide means for preventing the accumulation of dirt and moisture on the walls of the brake cylinder.

In the accompanying drawing; Fig. 1 is a view of a brake cylinder partly sectioned, and showing our invention applied thereto; Fig. 2 an enlarged sectional view of a portion of the bag employed to prevent dirt and moisture from accumulating on the walls of the brake cylinder; Fig. 3 an enlarged sectional view of another portion of said bag; and Fig. 4 a section of a portion of the bag.

The brake cylinder 1 as shown in the drawing is of the usual construction containing a piston 2 having a piston rod 3, which extends out through an opening in the non-pressure head 4, the brake cylinder piston 2 being acted upon by the usual release spring 5, tending to urge the piston to its release position.

According to our invention, for preventing the accumulation of dirt and moisture on the interior cylinder walls of the brake cylinder, at the non-pressure side of the piston, a bag or bellows is provided having a conical body portion 7, preferably of duck, with the inner face coated with rubber composition 8, and a smaller conical neck portion 9, preferably of plain or untreated duck.

The outer end of the bag is provided with a flange 10 which may be formed by slitting the end portion of the body 7 and turning the slitted portions to form the flange, a strip 11 of fabric and rubber composition cut on the bias being applied and cemented to the flange at the inner face.

Before applying the strip 11, the end portion of the flange is folded on itself to enclose a ring 12, preferably of brass wire, as shown in Fig. 2.

At intervals, corresponding with the spacing of the clamping bolts 13, the flange 10 is provided with openings adapted to receive grommets 14, preferably of brass, a flat metal ring 15 being applied to the fabric, before the inner flange of the grommet is turned down.

The neck portion 9 is provided with a section 16 which is adapted to overlap the end portion of the body 7 and which is cemented to the body. A ring 17, of brass wire is placed within the bag at the joint between the body and the neck portions and said ring may be secured in place by sewing.

At the extreme end, the neck portion is provided with a flange section on opposite sides of which are placed flat metal rings 18, which are preferably secured to the neck flange by rivets 19.

The spring 5 engages the inner ring 18 and presses the flange section of the neck portion 9 against the face of the piston 2.

The bag is inserted in the brake cylinder and then the non-pressure head 4 is applied and the clamping bolts 13 are then inserted, so as to clamp the non-pressure head to the brake cylinder body, with the flange 10 of the bag interposed.

Any dirt or moisture which may enter the brake cylinder around the piston rod 3 collects in the bag or bellows and is thus prevented from being deposited on the cylinder walls of the brake cylinder.

In order to allow any water to be drained out, as may accumulate within the bag, a threaded opening 20 may be provided in the non-pressure head 4, into which a threaded breather nozzle 21 is screwed.

The wire ring 12 prevents sagging of the flange 10, while the bag is being installed. The body portion 7 of the bag is interiorly coated with rubber composition, so as to render the bag waterproof and thus prevent leakage of water through the bag to the cylinder walls.

The neck portion 9 is made of plain duck, so that air may flow through the meshes of the fabric. This is for the purpose of preventing the build-up of pressure in the space between the walls of the bag and the brake cylinder walls, when the brake cylinder piston moves to apply the brakes, since such build-up of pressure would tend to collapse the bag. The wire ring 17 serves to prevent the collapse of the bag when the brake cylinder piston moves to apply the brakes. The engagement of the usual release spring 5 with the flanged section of the bag operates to maintain the bag in position and insure its movement with the brake cylinder piston in applying and releasing the brakes.

While one illustrative embodiment of the invention has been described in detail, it is not my intention to limit its scope to that embodiment or otherwise than by the terms of the appended claims.

Having now described our invention, what we claim as new and desire to secure by Letters Patent, is:—

1. The combination with a brake cylinder containing a piston and having a non-pressure head, and a piston rod connected to said piston and extending through an opening in said head, and a flexible bag disposed in the cylinder between the non-pressure head and the piston and detached from said piston for collecting foreign matter entering the cylinder around the piston rod.

2. The combination with a brake cylinder, of a flexible fabric bag mounted in said cylinder at the non-pressure side, for preventing the deposit of dirt and moisture on the interior walls of the cylinder, a portion of said bag being porous to permit passage of air.

3. The combination with a brake cylinder, of a flexible bag mounted in said cylinder for preventing the deposit of foreign matter on the cylinder walls, a portion of the bag being of porous material and another portion of non-porous material.

4. The combination with a brake cylinder, a piston and having a non-pressure head and a piston rod connected to said piston and extending through an opening in said head, of a flexible bag mounted in said cylinder between the non-pressure head and the piston, said bag comprising a body portion made of non-porous material and a neck portion made of porous material.

5. The combination with a brake cylinder, of a flexible dirt collecting bag mounted in said cylinder and having a flange section and a metallic ring carried by said flange section for maintaining the shape of the flange.

6. The combination with a brake cylinder, of a flexible dirt collecting bag mounted in said cylinder and having a metallic ring secured thereto at a point intermediate the ends of the bag.

7. The combination with a brake cylinder, of a flexible dirt collecting bag mounted in said cylinder and having a body portion and a neck portion, and a metal ring disposed at the juncture of the body portion and the neck portion.

8. The combination with a brake cylinder, of a flexible dirt collecting bag mounted in said cylinder and having a body portion provided with a flange section and a neck portion, a metal ring secured to the flange section, and a metal ring secured at the juncture of the body portion with the neck portion.

9. The combination with a brake cylinder, of a flexible dirt collecting bag mounted in said cylinder and having a conical body portion and a smaller conical neck portion and a metal ring secured to the bag at the juncture of the body and neck portions.

10. The combination with a brake cylinder, a piston mounted therein, and a release spring, of a flexible bag mounted in said cylinder and having a portion interposed between said spring and said piston.

11. The combination with a brake cylinder having a non-pressure head and a piston mounted in said brake cylinder, of a flexible bag disposed in said cylinder between the non-pressure head and the piston, said bag having a flange at one end, and a spring interposed between the non-pressure head and said flange and adapted to press the flange against the piston.

12. The combination with a brake cylinder having a non-pressure head and a piston mounted in said brake cylinder, of a flexible bag disposed in said cylinder and having a flange section at one end clamped between the non-pressure head and the brake cylinder.

13. The combination with a brake cylinder, a piston mounted therein, a non-pressure head, and a release spring acting on said piston, of a flexible bag mounted in said cylinder between the non-pressure head and the piston and having a flange clamped between the non-pressure head and the brake cylinder and a flange interposed between said spring and the piston.

14. The combination with a brake cylinder containing a piston and having a non-pressure head, of a flexible bag disposed in the brake cylinder between the non-pressure head and the piston, said non-pressure head being provided with an opening for permitting the drainage of moisture collecting in the bag.

In testimony whereof we have hereunto set our hands this 7th day of October, 1927.

CLYDE C. FARMER.
JOSEPH C. McCUNE.